United States Patent
Rune et al.

(10) Patent No.: US 11,096,147 B2
(45) Date of Patent: Aug. 17, 2021

(54) TRACKING AREA CODE ALLOCATION

(71) Applicant: Telefonaktiebolaget LM Ericsson (publ), Stockholm (SE)

(72) Inventors: Johan Rune, Stockholm (SE); Pål Frenger, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 462 days.

(21) Appl. No.: 15/539,090

(22) PCT Filed: Jul. 22, 2016

(86) PCT No.: PCT/EP2016/067591
§ 371 (c)(1),
(2) Date: Jun. 22, 2017

(87) PCT Pub. No.: WO2018/014978
PCT Pub. Date: Jan. 25, 2018

(65) Prior Publication Data
US 2019/0053192 A1    Feb. 14, 2019

(51) Int. Cl.
*H04W 68/06*    (2009.01)
*H04W 68/02*    (2009.01)
(Continued)

(52) U.S. Cl.
CPC .............. *H04W 68/06* (2013.01); *H04W 8/08* (2013.01); *H04W 8/26* (2013.01); *H04W 60/00* (2013.01); *H04W 68/02* (2013.01)

(58) Field of Classification Search
CPC combination set(s) only.
See application file for complete search history.

(56) References Cited

U.S. PATENT DOCUMENTS 9,137,768 B1* 9/2015 Singh .................... H04W 60/00
2005/0054349 A1* 3/2005 Balachandran ....... H04W 60/04
455/456.1
(Continued)

FOREIGN PATENT DOCUMENTS

CN    102469570 A    5/2012
CN    102685889 A    9/2012
(Continued)

OTHER PUBLICATIONS

Unknown, Author, "Hierarchical tracking Areas in the evolved system", 3GPP TSG SA WG2 Architecture—S2#53, S2-062062, Lisbon, Portugal, Jun. 26-30, 2006, 1-3.
(Continued)

*Primary Examiner* — Yee F Lam
(74) *Attorney, Agent, or Firm* — Murphy, Bilak & Homiller, PLLC

(57) ABSTRACT

A network node in a cellular communications network allocates a mobility area to a user equipment device, such that the user equipment device is not required to inform the network of its location while it remains in the mobility area. The mobility area comprises a plurality of tracking areas, and each tracking area has a respective identifier comprising a plurality of bits. The network node provides information to the user equipment device identifying the plurality of tracking areas forming the mobility area allocated to the user equipment device, wherein said information identifying the plurality of tracking areas forming the mobility area comprises fewer bits of information than the total number of bits in the respective identifiers of the plurality of tracking areas.

26 Claims, 8 Drawing Sheets

(51) Int. Cl.
*H04W 8/08* (2009.01)
*H04W 8/26* (2009.01)
*H04W 60/00* (2009.01)

(56) References Cited

U.S. PATENT DOCUMENTS

| | | | | |
|---|---|---|---|---|
| 2008/0102896 | A1* | 5/2008 | Wang | H04W 60/04 455/560 |
| 2008/0268878 | A1* | 10/2008 | Wang | H04W 68/00 455/458 |
| 2010/0061308 | A1* | 3/2010 | Becker | H04W 60/04 370/328 |
| 2010/0105382 | A1 | 4/2010 | Gallagher | |
| 2010/0255841 | A1 | 10/2010 | Kubo et al. | |
| 2012/0106468 | A1* | 5/2012 | Engstrom | H04L 61/30 370/329 |
| 2012/0110197 | A1* | 5/2012 | Miklos | H04W 36/12 709/228 |
| 2013/0070721 | A1* | 3/2013 | Zheng | H04W 8/26 370/329 |
| 2013/0111044 | A1* | 5/2013 | Cherian | H04W 76/00 709/228 |
| 2013/0130727 | A1* | 5/2013 | Hakola | H04W 68/02 455/458 |
| 2013/0155948 | A1* | 6/2013 | Pinheiro | H04W 76/10 370/328 |
| 2013/0183959 | A1* | 7/2013 | Mihaly | H04W 60/00 455/422.1 |
| 2013/0301501 | A1* | 11/2013 | Olvera-Hernandez | H04W 52/0216 370/311 |
| 2013/0337797 | A1* | 12/2013 | Ban | H04W 84/00 455/422.1 |
| 2014/0051428 | A1* | 2/2014 | Jung | H04W 24/08 455/422.1 |
| 2014/0099940 | A1* | 4/2014 | Kim | H04W 24/10 455/422.1 |
| 2014/0177506 | A1* | 6/2014 | Korus | H04W 4/06 370/312 |
| 2015/0237540 | A1* | 8/2015 | Van Lieshout | H04W 36/08 455/436 |
| 2016/0128020 | A1* | 5/2016 | Agarwal | H04W 68/04 370/328 |
| 2016/0277978 | A1* | 9/2016 | Tan Bergstrom | H04W 36/0061 |
| 2017/0126411 | A1* | 5/2017 | Piqueras Jover | H04L 9/3247 |
| 2017/0188280 | A1* | 6/2017 | Watfa | H04W 36/12 |
| 2018/0219653 | A1* | 8/2018 | Marsch | H04W 48/12 |
| 2019/0116483 | A1* | 4/2019 | Ryu | H04W 60/04 |
| 2019/0150108 | A1* | 5/2019 | Byun | H04W 56/001 370/329 |
| 2019/0174480 | A1* | 6/2019 | Wong | H04W 72/042 |
| 2019/0182788 | A1* | 6/2019 | Lee | H04W 60/00 |
| 2019/0289571 | A1* | 9/2019 | Park | H04W 60/00 |
| 2020/0322787 | A1* | 10/2020 | Sivavakeesar | H04L 61/6063 |

FOREIGN PATENT DOCUMENTS

| | | |
|---|---|---|
| CN | 103945367 A | 7/2014 |
| WO | 2014069954 A1 | 5/2014 |

OTHER PUBLICATIONS

Unknown, Author, "Pseudo-CR on Coding of the Tracking area identity list Information Element", 3GPP TSG CT WG1 Meeting #54, C1-082175, Zagreb, Croatia, Jun. 23-27, 2008, 1-6.

Unknown, Author, "The Home Cell Concept in Enhanced Packet System", 3GPP TSG CT WG1 Meeting #48, C1-071668, Vienna, Austria, Aug. 20-24, 2007, 1-3.

* cited by examiner

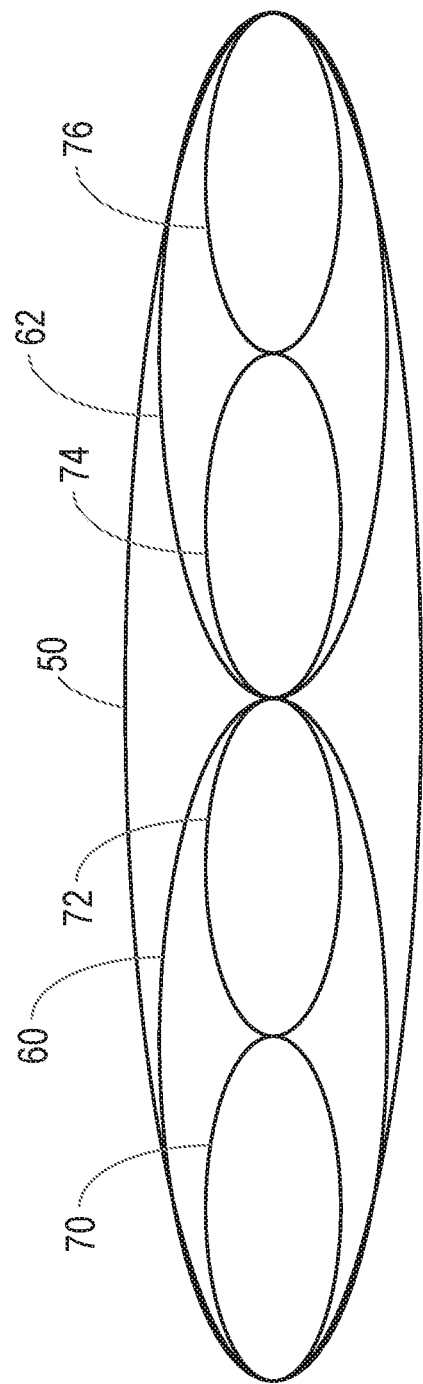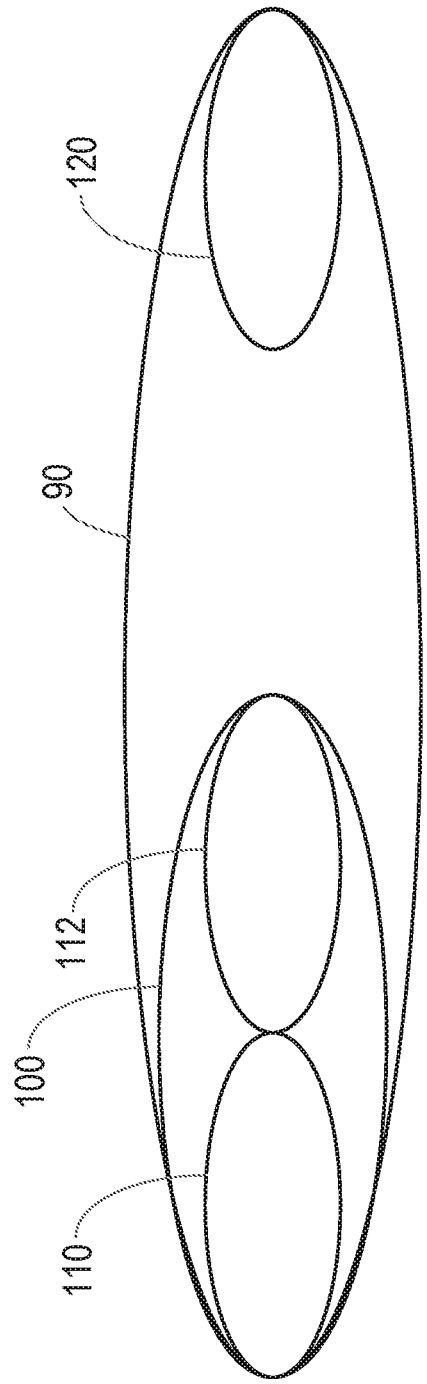

TRACKING AREA CODE ALLOCATION

TECHNICAL FIELD

This relates to cellular communications networks, and in particular to methods of notifying a UE of a mobility area, and of using such a notification.

BACKGROUND

Cellular communications networks may define an energy efficient mode for inactive (e.g. idle) user equipment devices, or UEs, where the UE can move around in a certain limited area (e.g. a number of cells) without informing the network of its whereabouts. For this purpose a UE in the energy efficient state is allocated a certain area to freely move around in.

To let the UE know which area it is currently located in, the network periodically broadcasts an area code, and the UE is then expected to inform the network if it leaves its allocated area, e.g. if it moves into a cell not belonging to the area.

In general, the size of the area that is allocated to a UE in such an energy efficient state is a compromise, with a smaller area being more efficient in terms of the control signaling that is required for paging the UE, and a larger area being more efficient in terms of the control signaling required for the UE to notify the network of its location.

Thus, the area that is allocated to a UE may be made up of many smaller areas, each of which will have its own identifier. Notifying the UE of this allocated area may therefore involve transmitting a long list of the identifiers of the smaller areas, which may be cumbersome and inefficient.

SUMMARY

According to an aspect of the invention, there is provided a method of operation of a network node in a cellular communications network. The method comprises: allocating to a user equipment device a mobility area, wherein the user equipment device is not required to inform the network of its location while it remains in the mobility area, wherein the mobility area comprises a plurality of tracking areas, and wherein each tracking area has a respective identifier comprising a plurality of bits; and providing information to the user equipment device identifying the plurality of tracking areas forming the mobility area allocated to the user equipment device, wherein said information identifying the plurality of tracking areas forming the mobility area comprises fewer bits of information than the total number of bits in the respective identifiers of the plurality of tracking areas.

According to an aspect of the invention, there is provided a network node configured to operate in accordance with the previous method.

According to an aspect of the invention, there is provided a network node comprising a processor and a memory. The memory contains instructions executable by the processor, such that the network node is operable to: allocate to a user equipment device a mobility area, wherein the user equipment device is not required to inform the network of its location while it remains in the mobility area, wherein the mobility area comprises a plurality of tracking areas, and wherein each tracking area has a respective identifier comprising a plurality of bits; and provide information to the user equipment device identifying the plurality of tracking areas forming the mobility area allocated to the user equipment device, wherein said information identifying the plurality of tracking areas forming the mobility area comprises fewer bits of information than the total number of bits in the respective identifiers of the plurality of tracking areas.

According to an aspect of the invention, there is provided a network node comprising: an allocating module for allocating to a user equipment device a mobility area, wherein the user equipment device is not required to inform the network of its location while it remains in the mobility area, wherein the mobility area comprises a plurality of tracking areas, and wherein each tracking area has a respective identifier comprising a plurality of bits; and a providing module for providing information to the user equipment device identifying the plurality of tracking areas forming the mobility area allocated to the user equipment device, wherein said information identifying the plurality of tracking areas forming the mobility area comprises fewer bits of information than the total number of bits in the respective identifiers of the plurality of tracking areas.

According to an aspect of the invention, there are provided a computer program configured, when run on a computer, to carry out the previous method, and a computer program product comprising a computer readable medium and such a computer program.

According to an aspect of the invention, there is provided a method of operation of a user equipment device in a cellular communications network. The method comprises: receiving information from a network node identifying a plurality of tracking areas, wherein the plurality of tracking areas form a mobility area allocated to the user equipment device, wherein the user equipment device is not required to inform the network of its location while it remains in the mobility area, wherein each tracking area has a respective identifier comprising a plurality of bits, and wherein said information identifying the plurality of tracking areas forming the mobility area comprises fewer bits of information than the total number of bits in the respective identifiers of the plurality of tracking areas.

According to an aspect of the invention, there is provided a user equipment device configured to operate in accordance with the previous method.

According to an aspect of the invention, there is provided a user equipment device comprising a processor and a memory. The memory contains instructions executable by the processor, such that the mobile device is operable to: receive information from a network node identifying a plurality of tracking areas, wherein the plurality of tracking areas form a mobility area allocated to the user equipment device, wherein the user equipment device is not required to inform the network of its location while it remains in the mobility area, wherein each tracking area has a respective identifier comprising a plurality of bits, and wherein said information identifying the plurality of tracking areas forming the mobility area comprises fewer bits of information than the total number of bits in the respective identifiers of the plurality of tracking areas.

According to an aspect of the invention, there is provided a user equipment device comprising: a receiving module for receiving information from a network node identifying a plurality of tracking areas, wherein the plurality of tracking areas form a mobility area allocated to the user equipment device, wherein the user equipment device is not required to inform the network of its location while it remains in the mobility area, wherein each tracking area has a respective identifier comprising a plurality of bits, and wherein said information identifying the plurality of tracking areas forming the mobility area comprises fewer bits of information than the total number of bits in the respective identifiers of the plurality of tracking areas.

According to an aspect of the invention, there are provided a computer program configured, when run on a computer, to carry out the previous method, and a computer program product comprising a computer readable medium and such a computer program.

According to an aspect of the invention, there is provided a method of allocating tracking area identifiers to tracking areas. The method comprises: defining a hierarchical structure of tracking areas, wherein at least one first tracking area is located partly or wholly within a second tracking area, and wherein the second tracking area is located wholly or partly within a third tracking area; allocating to the third tracking area a tracking area identifier; allocating to the second tracking area a tracking area identifier that has a first number of most significant bits that are equal to the first number of most significant bits of the tracking area identifier allocated to the third tracking area; and allocating to the or each first tracking area a respective tracking area identifier that has a second number of most significant bits that are equal to the second number of most significant bits of the tracking area identifier allocated to the second tracking area identifier, wherein the second number is larger than the first number.

According to an aspect of the invention, there is provided a network node configured to operate in accordance with the previous method.

According to an aspect of the invention, there is provided a network node comprising a processor and a memory. The memory contains instructions executable by the processor, such that the network node is operable to: define a hierarchical structure of tracking areas, wherein at least one first tracking area is located partly or wholly within a second tracking area, and wherein the second tracking area is located wholly or partly within a third tracking area; allocate to the third tracking area a tracking area identifier; allocate to the second tracking area a tracking area identifier that has a first number of most significant bits that are equal to the first number of most significant bits of the tracking area identifier allocated to the third tracking area; and allocate to the or each first tracking area a respective tracking area identifier that has a second number of most significant bits that are equal to the second number of most significant bits of the tracking area identifier allocated to the second tracking area identifier, wherein the second number is larger than the first number.

According to an aspect of the invention, there is provided a network node comprising: a defining module for defining a hierarchical structure of tracking areas, wherein at least one first tracking area is located partly or wholly within a second tracking area, and wherein the second tracking area is located wholly or partly within a third tracking area; an allocating module for allocating to the third tracking area a tracking area identifier; an allocating module for allocating to the second tracking area a tracking area identifier that has a first number of most significant bits that are equal to the first number of most significant bits of the tracking area identifier allocated to the third tracking area; and an allocating module for allocating to the or each first tracking area a respective tracking area identifier that has a second number of most significant bits that are equal to the second number of most significant bits of the tracking area identifier allocated to the second tracking area identifier, wherein the second number is larger than the first number.

According to an aspect of the invention, there are provided a computer program configured, when run on a computer, to carry out the previous method, and a computer program product comprising a computer readable medium and such a computer program.

Thus, hierarchical tracking areas can be implemented by providing a compact and efficient method of identifying the tracking areas and encoding the identifiers for transmission, and by providing a suitable UE configuration for decoding the identifiers. This reduces the required overhead for the signaling of the tracking configuration to the UE, compared to sending a list of the tracking area identifiers that make up the area that the UE is allowed to move around in, and potentially also for the broadcasting of tracking area identifiers.

BRIEF DESCRIPTION OF DRAWINGS

FIG. 2 illustrates one example of tracking areas in the network of FIG. 1.

FIG. 3 illustrates another example of tracking areas in the network of FIG. 1.

DETAILED DESCRIPTION

Figure 1:
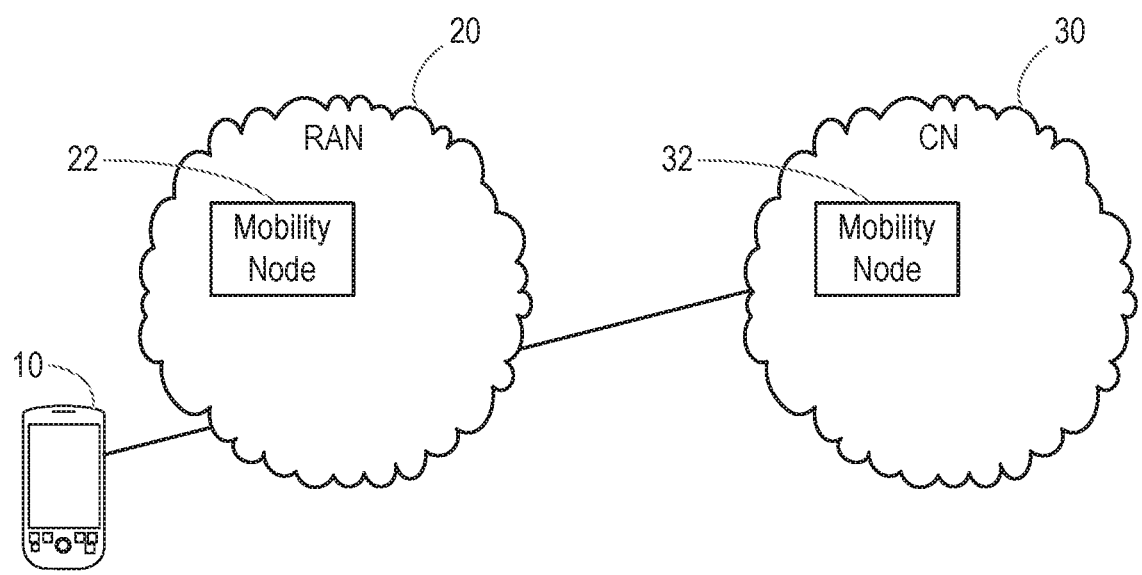
FIG. 1 illustrates a part of a mobile communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment, or user equipment device (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

FIG. 1 illustrates a part of a mobile communications network. Specifically, FIG. 1 illustrates a user equipment, or UE, 10. It will be appreciated that a real network would include many UEs, but the present invention can be described sufficiently with reference to one such UE.

In this example, the mobile communications network comprises a radio access network, or RAN, 20, and a core network, or CN, 30.

As is conventional, the radio access network 20 may comprise multiple radio transceivers, allowing devices such as the UE 10 to connect to the network, while the core network 30 routes call and provides other network functions.

The mobile communications network may be a $3^{rd}$ Generation Universal Mobile Telecommunications System (UMTS) network, a Long Term Evolution (LTE) network based on the Evolved Packet System (EPS), a $5^{th}$ Generation network, or any other mobile communications network.

As shown in FIG. 1, the radio access network 20 may comprise a mobility node 22, and/or the core network 30 may comprise a mobility node 32.

Herein, reference is made to functions being performed in the mobility node 22 of the radio access network 20 or to functions being performed in the radio access network 20, and/or to functions being performed in the mobility node 32 or to functions being performed in the core network 30, and/or to functions being performed in the network more generally. In all such cases, while the functions may be initiated in the relevant nodes or networks, and while communications with UEs may be passed through the relevant nodes or networks, some or all of the relevant processing functions may in fact be performed in a cloud computing network.

In a network such as that shown in FIG. 1, there are typically a large number of cells, and the UE 10 will typically obtain service through a radio transceiver (for example a radio base station) that is located in that cell.

In general, a cellular communications network needs to know the location of each UE, in order to be able to direct calls to the UE. However, cellular communications networks may define an energy efficient mode for inactive (e.g. idle) UEs, where the UE can move around in a certain limited area (e.g. a number of cells) without informing the network of its whereabouts within that limited area. For this purpose a UE in the energy efficient state is assigned a certain area to freely move around in.

To let the UE know which area it is currently located in, the network periodically broadcasts an area code, and the UE is then expected to inform the network if it leaves its allocated area, e.g. if it moves into a cell not belonging to the area.

In general, the size of the area that is allocated to a UE in such an energy efficient state is a compromise, with a smaller area being more efficient in terms of the control signaling that is required for paging the UE (because the network needs to transmit the paging signal to a smaller number of cells), and a larger area being more efficient in terms of the control signaling required for the UE to notify the network of its location (because the UE is likely to move outside its allocated area less often).

In order to achieve this, the area served by the network is divided into tracking areas, which may overlap with each other, with each tracking area covering one or more cells. Then each cell within the tracking area periodically broadcasts an identifier that is allocated to the tracking area, so that the UE is able to determine whether it remains within the allocated area in which the UE is not required to inform the network of its location.

In this description, the term "tracking area" is used to define an area that is determined by the network, and that has its own identifier that is broadcast by cells within the area. For example, each tracking area identifier may be comprise a plurality of bits of binary information. When combined with a Public Land Mobile Network (PLMN) identifier, the tracking area identifier may become a globally unique area identifier.

The term "mobility area" is used to define an area that is allocated to a specific UE, such that, for as long as the UE remains in an idle or dormant state within the allocated mobility area, it is not required to inform the network of its location.

In principle, the mobility area that is allocated to a UE may comprise just one tracking area. However, the mobility area that is allocated to a UE may be made up of many smaller tracking areas, each of which will have its own identifier as noted above. In this case, it is necessary to provide information to the user equipment device identifying the plurality of tracking areas forming the mobility area allocated to the user equipment device.

In EPS/LTE networks, an allocated mobility area may comprise a set (or list) of Tracking Areas (TAs). In 3G/UMTS networks, a tracking area may be referred to as a Location Area and/or a Routing Area.

In EPS/LTE networks and in 3G/UMTS networks, the allocation of the mobility areas is managed and controlled by the core network, and in particular by one or more mobility node such as the mobility node 32 shown in FIG. 1. In such a network, the RAN is unaware of the UE. When the network needs to reach the UE, e.g. to deliver downlink data, the network pages the UE in the area allocated to the UE. Optionally, the paging can be performed in steps in order to limit the usage of control signaling (e.g. paging) resources, e.g. by first paging in the area, e.g. cell, the UE was last known to be located, and then in the rest of the area allocated to the UE, if no response is received in the first step. The paging is initiated and controlled by the core network.

In other networks, for example 5G networks, a similar energy efficient state may be controlled by the RAN, and in particular by one or more mobility node such as the mobility node 22 shown in FIG. 1. This energy efficient state controlled by the RAN would be invisible to the core network and the core network would see a UE in this state as a connected UE. When the network needs to reach the UE, the RAN initiates and controls the paging. A tracking area in this energy efficient state controlled by the RAN may be denoted a Tracking RAN Area (TRA). Thus, the mobility area allocated to a UE in this energy efficient state may comprise a Tracking RAN Area or a list of Tracking RAN Areas.

Thus, simply by way of examples, the area code that is periodically broadcast by the network to let a UE know which area it is currently located in may be a Location Area Code (LAC), a Tracking Area Code (TAC) or a Tracking RAN Area Code (TRAC).

In general, the size of the area allocated to a UE in such an energy efficient state (regardless of whether this is controlled by the RAN or by the core network) is a compromise, with a smaller area being more efficient in terms of the control signaling that is required for paging the UE, and a larger area being more efficient in terms of the control signaling required for the UE to notify the network of its location. The optimal tradeoff therefore depends on the relation between the traffic intensity and the mobility of the UE.

In order to assist with this, hierarchical tracking areas may be defined.

FIG. 2 shows an example of an arrangement in which hierarchical tracking areas have been defined.

Specifically, FIG. 2 shows an arrangement with a three level hierarchy, by way of illustration only. In this example, there is a top level tracking area 50. Located wholly or partly within the top level tracking area 50 are two smaller intermediate level tracking areas 60, 62. Located wholly or partly within the intermediate level tracking area 60 are two smaller lower level tracking areas 70, 72, and located wholly or partly within the intermediate level tracking area 62 are two smaller lower level tracking areas 74, 76.

This arrangement provides increased flexibility in the allocation of mobility areas to UEs, for example allowing the wireless network to accommodate UEs with significantly different relations between traffic intensity and mobility, by allocating larger mobility areas to some UEs than to others.

However, where a UE is allocated a large mobility area, this could require the network to configure the UE by transmitting a long list of tracking area identifiers and/or could require that each cell is required to transmit multiple tracking area identifiers relating to tracking areas at different levels of the hierarchical arrangement.

According to the present disclosure, the network provides information to the UE identifying the plurality of tracking areas forming the mobility area allocated to the UE, wherein said information identifying the plurality of tracking areas forming the mobility area comprises fewer bits of information than the total number of bits in the respective identifiers of the plurality of tracking areas.

According to one embodiment of the present disclosure, when there is defined a hierarchical structure of tracking areas as shown in FIG. 2, wherein at least one first tracking area is located partly or wholly within a second tracking area, and wherein the second tracking area is located wholly or partly within a third tracking area. A tracking area identifier is allocated to the third tracking area. A tracking area identifier is then allocated to the second tracking area that has a first number of most significant bits that are equal to the first number of most significant bits of the tracking area identifier allocated to the third tracking area. Further a respective tracking area identifier is allocated to the or each first tracking area that has a second number of most significant bits that are equal to the second number of most significant bits of the tracking area identifier allocated to the second tracking area identifier, wherein the second number is larger than the first number.

This is illustrated with reference to the example given in FIG. 2. In this example, there are two first tracking areas 70, 72 located partly or wholly within a second tracking area 60, and the second tracking area 60 is located wholly or partly within a third tracking area 50. Also, there are two other first tracking areas 74, 76 located partly or wholly within a different second tracking area 62, and that second tracking area 62 is located wholly or partly within the third tracking area 50.

By way of an illustrative example, a tracking area identifier 1101011100000000 is allocated to the third tracking area 50.

A tracking area identifier 1101011101010000 is then allocated to the second tracking area 60, and it will be noted that the eight most significant bits of this tracking area identifier are equal to the eight most significant bits of the tracking area identifier allocated to the third tracking area 50, while the eight least significant bits of this tracking area identifier are not all equal to the eight least significant bits of the tracking area identifier allocated to the third tracking area 50.

Further a tracking area identifier 1101011101011001 is allocated to the first tracking area 70, and a tracking area identifier 1101011101011011 is allocated to the other first tracking area 72. Each of these tracking area identifiers has twelve most significant bits that are equal to the twelve most significant bits of the tracking area identifier allocated to the second tracking area 60, while the four least significant bits of these tracking area identifiers are not all equal to the four least significant bits of the tracking area identifier allocated to the second tracking area 60.

At the same time, a tracking area identifier 1101011101110000 is then allocated to the other second tracking area 62, and it will be noted that the eight most significant bits of this tracking area identifier are also equal to the eight most significant bits of the tracking area identifier allocated to the third tracking area 50, while the eight least significant bits of this tracking area identifier are not all equal to the eight least significant bits of the tracking area identifier allocated to the third tracking area 50.

Further a tracking area identifier 1101011101111001 is allocated to the first tracking area 74, and a tracking area identifier 1101011101111011 is allocated to the other first tracking area 76. Each of these tracking area identifiers has twelve most significant bits that are equal to the twelve most significant bits of the tracking area identifier allocated to the other second tracking area 62, while the four least significant bits of these tracking area identifiers are not all equal to the four least significant bits of the tracking area identifier allocated to the second tracking area 62.

It will be appreciated that the numbers of bits that are equal between the different tracking area identifiers can be any suitable numbers.

This arrangement means that, when the UE is allocated a mobility area that is larger than a single lower level tracking area, it is not necessary for the network to transmit the full tracking area identifiers of all of the tracking areas that make up the mobility area.

One possibility is for the network node controlling the allocation of the mobility area to transmit to the UE a mask, indicating a subset of the bits of each identifier, such that the identifiers of the tracking areas making up the mobility area are identical when considering that subset of the bits.

Thus, in the example given above, if the mobility area allocated to the UE corresponds to the whole of the top level tracking area 50, which may for example be appropriate if the UE is determined to be fast moving, the network node could transmit a mask 1111111100000000. Thus, the eight most significant bits are set to 1 and the remaining bits are set to 0.

When a UE receives a tracking area identifier broadcast by a cell, and wishes to determine whether that tracking area identifier is part of its mobility area, it applies that mask to the received tracking area identifier.

Applying the mask may comprise performing a Boolean AND operation between the received tracking area identifier and the mask. Where, as in this example, the mask has its most significant bits are set to 1 and the remaining bits are set to 0, the result of this operation is a string of bits of the same length as the received tracking area identifier, in which the most significant bits of the result are the same as the most significant bits of the received tracking area and the least significant bits are all 0.

This effectively means that only the most significant bits are considered when determining whether the received tracking area identifier relates to a tracking area that is part of its mobility area.

Thus, in this example, as discussed above, any tracking area, such as the tracking areas 70, 72, 74, 76 that is located within the top level tracking area 50 has the same eight most significant bits, and so the UE will recognize that it has not left the mobility area. However, if the UE leaves the top level tracking area 50 it will receive a tracking area identifier from the cell that it enters, and that identifier will not have the same eight most significant bits, and so the UE will recognize that it has left the mobility area. In response to determining that it has left the allocated mobility area, the UE sends a tracking area update message to the network to inform it of its current location.

As a further example, if the mobility area allocated to the UE corresponds to the intermediate level tracking area 60, the network node could transmit a mask 1111111111110000. Thus, the twelve most significant bits are set to 1 and the remaining bits are set to 0.

When the UE receives a tracking area identifier broadcast by a cell, and wishes to determine whether that tracking area identifier is part of its mobility area, it applies that mask to the received tracking area identifier.

As before, this means that only the twelve most significant bits are considered when determining whether the received tracking area identifier relates to a tracking area that is part of the UE's mobility area.

In this example, as discussed above, any tracking area, such as the tracking areas 70, 72, that is located within the intermediate level tracking area 60 has the same twelve most significant bits, and so the UE will recognize that it has not left the mobility area.

Similarly, if the mobility area allocated to the UE corresponds to the intermediate level tracking area 62, the network node could again transmit a mask 1111111111110000, with the twelve most significant bits set to 1 and the remaining bits set to 0.

In this example, as discussed above, any tracking area, such as the tracking areas 74, 76, that is located within the intermediate level tracking area 62 has the same twelve most significant bits, and so the UE will recognize that it has not left the mobility area.

Thus, the network node provides information identifying the plurality of tracking areas forming the mobility area allocated to the user equipment device without needing to provide the full tracking area identifiers of all of the tracking areas.

If the mobility area allocated to the UE corresponds to one of the lower level tracking areas 70, 72, 74, 76, which may for example be appropriate if the UE is determined to be stationary, the network node could again transmit a mask 1111111111111111, with all bits set to 1. This would have the effect that all bits of a received tracking area identifier would be considered by the UE, which would then recognize that it had left the mobility area if it received any different tracking area identifier. In response to determining that it has left the allocated mobility area, the UE sends a tracking area update message to the network to inform it of its current location.

In all of these cases, the length of the mask that is transmitted is related to the numbers of bits that are equal between the relevant tracking area identifiers, and this can be chosen to be any suitable number.

As an alternative to transmitting a mask as described above, the network node managing the mobility areas may instead configure the UE by transmitting to it a list of one or more truncated tracking area identifiers. Where the list comprises more than one truncated tracking area identifier, they may have the same or different lengths.

In this case, if the mobility area allocated to the UE corresponds to the top level tracking area 50, the network node could transmit a truncated tracking area identifier 11010111, containing only eight bits.

This means that, when a UE is determining whether a tracking area identifier, that it receives from its current cell, relates to a tracking area that is part of its mobility area, it only considers the eight most significant bits of the received tracking area identifier.

Thus, in this example, as discussed above, any tracking area, such as the tracking areas 70, 72, 74, 76 that is located within the top level tracking area 50 has the same eight most significant bits, and so the UE will recognize that it has not left the mobility area.

As a further example, if the mobility area allocated to the UE corresponds to the intermediate level tracking area 60, the network node could transmit a truncated tracking area identifier 110101110101, containing only twelve bits.

This means that, when a UE is determining whether a tracking area identifier, that it receives from its current cell, relates to a tracking area that is part of its mobility area, it only considers the twelve most significant bits of the received tracking area identifier.

In this example, as discussed above, any tracking area, such as the tracking areas 70, 72, that is located within the intermediate level tracking area 60 has the same twelve most significant bits, and so the UE will recognize that it has not left the mobility area.

Similarly, if the mobility area allocated to the UE corresponds to the intermediate level tracking area 62, the network node could transmit a truncated tracking area identifier 110101110111, containing only twelve bits.

In this example, as discussed above, any tracking area, such as the tracking areas 74, 76, that is located within the intermediate level tracking area 62 has the same twelve most significant bits, and so the UE will recognize that it has not left the mobility area.

Thus, again, the network node provides information identifying the plurality of tracking areas forming the mobility area allocated to the user equipment device without needing to provide the full tracking area identifiers of all of the tracking areas.

In all of these cases, the length of the truncated tracking area identifier that is transmitted is related to the numbers of bits that are equal between the relevant tracking area identifiers, and this can be chosen to be any suitable number.

As a further example, the network node may provide to the UE information simply identifying the number of bits of the received tracking area identifier that it should consider when determining whether it remains within its mobility area. Thus, in the examples described above, the network node may provide to the UE the number "8" or "12", indicating that it should consider only the first 8 or 12 bits of any received tracking area identifier, in order to determine whether it remains within its mobility area.

In all of these examples, reference has been made to the relevant network node providing information to the user equipment device identifying a plurality of tracking areas, wherein the information identifying the plurality of tracking areas comprises fewer bits of information than the total number of bits in the respective identifiers of the plurality of tracking areas, and wherein the plurality of tracking areas form the whole of the mobility area allocated to the user equipment device.

However, in other examples, the mobility area allocated to the user equipment device may comprise one or more other tracking areas in addition to the plurality of tracking areas identified by the information provided to the user equipment device.

For example, the mobility area allocated to the UE may correspond to the intermediate level tracking area 60, which can be notified to the UE by transmitting a suitable mask or truncated tracking area identifier as discussed above, plus the lower level tracking area 74, which can be notified to the UE by transmitting its whole tracking area identifier.

The hierarchical arrangement of tracking areas described herein can be realized in a completely flat (or homogeneous) physical deployment (e.g. without macro, micro and pico cell levels). The network could be divided into fairly small tracking areas, e.g. a few cells or radio access nodes each (or a single cell or radio access node in some cases), each broadcasting a dedicated tracking area identifier of the lowest level. The tracking area hierarchy is then a purely logical structure that is realized through the smart, compact configuration of lists of truncated (or masked) tracking area identifiers in the UEs, which may be adapted to the (expected) behavior of each UE. The choice of configuration for a particular UE may depend on many aspects and circumstances, such as: the UE's subscribed services, the UE category, mobility predictions (e.g. based on accumulated subscriber/UE specific statistics or based the UE category), battery status, general energy efficiency requirement, typical traffic intensity (e.g. based on subscriber/UE specific statistics, subscriber data or UE category), etc.

In a completely flat physical deployment, such as in a homogeneous macro deployment scenario, there may also be hierarchies that are hidden from the UEs. For example some nodes may belong to the same C-RAN (centralized RAN) processing node, in which a significant part of the baseband processing is jointly performed. Some nodes may be connected to the same access gateway or the same Mobility Management Entity (MME) or to some other higher layer RAN or core network node or virtualized function. Some nodes (e.g. nodes configured for coordinated multi-point transmissions and reception, CoMP) may be connected with high speed communication connections (such as fiber based X2 in case of LTE) and can therefore be treated as a joint hierarchical level when the UE tracking function is configured.

Some nodes may share some of the RAN functions such as user context storage. Cells or radio access nodes that for some reason are grouped together in such manners may constitute a natural hierarchical separation of the nodes and this can then also be used to create hierarchical tracking areas along the same divisions.

It may be preferable to use a flexible coding and/or configuration of tracking area identifiers, so that strict hierarchical levels that map to the geographical structure of the tracking areas are formed. The tracking areas on one level being fully covered by a tracking area on a higher level with a set of significant bits in the higher level tracking area identifier being equal to the same number of initial bits of the tracking area identifier of the lower level. However, this is not a requirement. The deployment of tracking areas and tracking area identifiers with different numbers of significant bits may be totally flexible if desired, e.g. with a lower level tracking area only partly overlapped by a higher level tracking area with the significant bits equal to the initial bits of the tracking area identifier of the lower level, or even totally non-overlapping deployments.

FIG. 3 shows another example of an arrangement in which hierarchical tracking areas have been defined.

Specifically, FIG. 3 shows an arrangement with a three level hierarchy, by way of illustration only. In this example, there is a top level tracking area 90. Located wholly or partly within the top level tracking area 90 is a smaller intermediate level tracking area 100. Located wholly or partly within the intermediate level tracking area 100 are two smaller lower level tracking areas 110, 112. In addition, located wholly or partly within the top level tracking area 90 is a lower level tracking area 120.

One situation that may occur in practice is that in general an operator may want to allow a UE to move around freely (without informing the network) in the entire geographical area covered by the top level tracking area 90, but knows (from experience or other reasons) that a UE which enters (or is located in) the lower level tracking area 120 typically becomes more or less stationary and remains in that tracking area for a significant time. Therefore, when an idle or dormant UE enters the tracking area 120, it is beneficial for the network to know, so that it can reduce the paging area to match the expected low future mobility of the UE.

Another similar situation is where the tracking area 120 represents one or more cell(s) or radio access node(s) of a certain kind, in which the UE's presence should trigger special procedures in the network, e.g. a Closed Subscriber Group cell or an area in which the RAN provides special services/support for an industrial plant.

In order to provide the required benefit, the allocation of tracking area identifiers may not follow the hierarchical deployment of the tracking areas.

For example, as shown in the example of FIG. 2, a tracking area identifier 1101011100000000 is allocated to the top level tracking area 90.

A tracking area identifier 1101011101010000 is then allocated to the intermediate level tracking area 100, and it will be noted that the eight most significant bits of this tracking area identifier are equal to the eight most significant bits of the tracking area identifier allocated to the tracking area 90, while the eight least significant bits of this tracking area identifier are not all equal to the eight least significant bits of the tracking area identifier allocated to the tracking area 90.

Further a tracking area identifier 1101011101011001 is allocated to the lower level tracking area 110, and a tracking area identifier 1101011101011011 is allocated to the other lower level tracking area 112. Each of these tracking area identifiers has twelve most significant bits that are equal to the twelve most significant bits of the tracking area identifier allocated to the tracking area 100, while the four least significant bits of these tracking area identifiers are not all equal to the four least significant bits of the tracking area identifier allocated to the tracking area 100.

However, this hierarchical structure is not followed when allocating a tracking area identifier to the lower level tracking area 120. In this example, a tracking area identifier 1111011111011011 is allocated to the lower level tracking area 120. Thus, the eight most significant bits of this tracking area identifier are not equal to the eight most significant bits of the tracking area identifier allocated to the top level tracking area 90.

Thus, when a UE is within the top level tracking area 90 and outside the lower level tracking area 120, it may be configured as described with reference to FIG. 2, for example by notifying it of a suitable mask, or a suitable truncated identifier, or the number 8, meaning that it examines the eight most significant bits of the tracking area identifier that it detects from the cell in which it is located.

For as long as the UE is within the top level tracking area 90 and outside the lower level tracking area 120, the tracking area identifiers that it can detect, having been broadcast from the respective cells, will have the same eight most significant bits, and so it will be able to determine that it remains within its mobility area. However, when it enters the lower level tracking area 120 the tracking area identifier that it will detect being broadcast from the respective cell will be the tracking area identifier 1111011111011011 that was allocated to the lower level tracking area 120. The eight most significant bits of this tracking area identifier are not equal to the eight most significant bits of the tracking area identifier allocated to the top level tracking area 90, and so the UE will determine that it has left its allocated mobility area.

The UE will then send a tracking area update message to the network, to indicate that it has left its mobility area. The network will then be able to take suitable steps to be ready to page the UE in its new location, if required.

For example, the UE may then be reconfigured with information defining a new mobility area that covers only the lower level tracking area 120.

One alternative possibility is that, when the UE is within the lower level tracking area 120, it is configured with information defining a mobility area that includes the whole of the top level tracking area 90 including the lower level tracking area 120. This information could consist of the truncated tracking area identifier that applies to the tracking areas except the tracking area 120 (or the mask identifies the identifiers of these tracking areas), plus the tracking area identifier of the lower level tracking area 120.

Then, in order to optimize the paging, the network may use a step-wise expansion of the paging area, in which the network first pages the UE only in the tracking area 120, and then, only if no response is received, the network pages the UE in the remainder of the top level tracking area 90. The network will have been informed when the UE entered the tracking area 120, because the tracking area 120 was not part of the UEs allocated mobility area before it entered that area, and so the UE was forced to send a tracking area update when it entered the tracking area 120.

Different embodiments described above describe different methods to encode and compress of a set of identifiers, mapping a larger set of identifiers into a smaller set. However, other methods that map a large set of identifiers into a smaller set could be used for this solution, e.g. using a bitmap or using hash functions and Cyclic Redundancy Check (CRC) type methods.

For example, a bitmap could be used in a situation in which a high level tracking area includes 16 low level tracking areas. The network wants to allocate to a UE that is located within the high level tracking area a mobility area that allows it to move around in just some of the low level tracking areas without informing the network.

In order to achieve this, for example, the network allocates to the low level tracking areas tracking area identifiers that share a certain number of their most significant bits with the tracking area identifier of the high level tracking area. The tracking area identifiers allocated to the low level tracking areas may for example differ from each other in their 4 least significant bits. Thus, every one of the 16 possible combinations of these 4 least significant bits is included in the tracking area identifier of just one of the low level tracking areas. These combinations of the 4 least significant bits are mapped to positions in a 16-bit bit map. Thus, for example, the tracking area with the identifier having the 4 least significant bits 0000 is mapped to the least significant bit of the 16-bit bit map; the tracking area with the identifier having the 4 least significant bits 0001 is mapped to the second least significant bit of the 16-bit bit map; the tracking area with the identifier having the 4 least significant bits 0010 is mapped to the third least significant bit of the 16-bit bit map; and so on until the tracking area with the identifier having the 4 least significant bits 1111 is mapped to the most significant bit of the 16-bit bit map.

The network then configures the UE with the significant bits of the tracking area identifier of the high level tracking area, which are shared by the tracking area identifiers of all of the low layer tracking area within the high level tracking area, and with the bitmap, which represents which of the low level tracking areas form the mobility area for that specific UE. For example, if a bit in the bit map is set to 1, this may indicate that the relevant tracking area forms part of the mobility area of the UE, while if a bit in the bit map is set to 0, this may indicate that the relevant tracking area does not form part of the mobility area of the UE.

Thus, if the network wishes to allocate to a particular UE a mobility area that includes seven of the low level tracking areas within the high level tracking area, seven specific bits in the bit map (corresponding to those seven low level tracking areas) are set to 1, while nine of the bits are set to 0.

The UE is thus able to determine which tracking areas form part of its mobility area. While the UE remains within its mobility area, it is not required to inform the network of its location. However, when the UE determines that it has left its mobility area, it is required to inform the network of its location by a suitable tracking area update message in the relevant protocol.

Thus, there are described methods that enable the introduction of hierarchical tracking areas, while maintaining compact and efficient methods both for signaling (i.e. broadcasting) to the UEs the tracking area(s) that the current radio access node or cell supports and for configuring the idle/dormant UEs with individually adapted lists of tracking area(s), in which the expected UE mobility and traffic intensity is taken into account.

The tracking area identifiers may consist of a subnetwork structure (similar to the IP address space) e.g. allowing subnet masking to define new tracking area identifiers and tracking area identifier lists. This implies that compression of a set of tracking area identifiers is enabled, such that a large set of identifiers is mapped into a smaller set. Multiple such functions are possible; one is masking, one is a bitmap, one is to use hash functions including CRC type methods, one is to truncate the tracking area identifier, but in principal any function that maps a large set into a smaller can be used.

Figure 4:
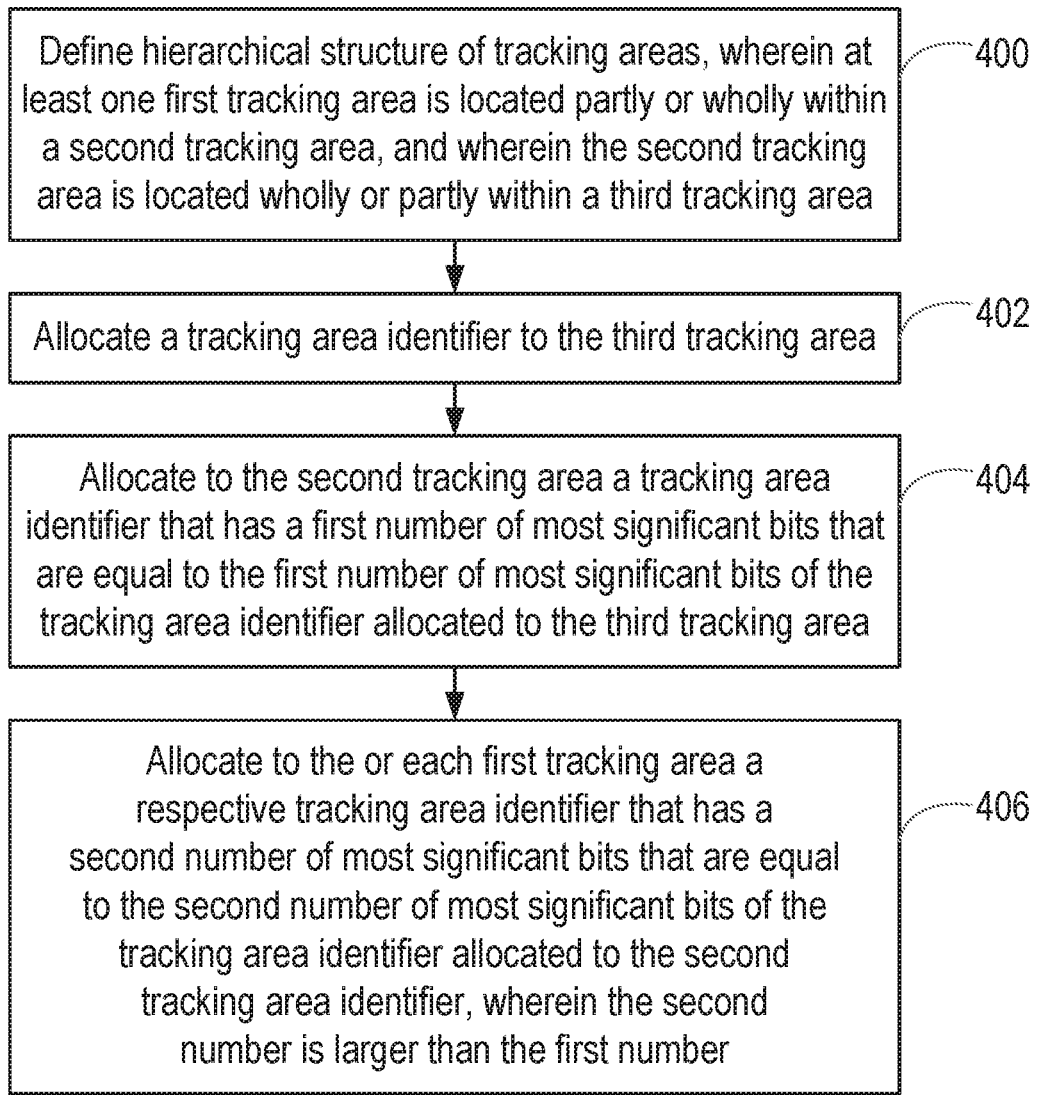
FIG. 4 is a flow chart illustrating a first method.

FIG. 4 is a flow chart, illustrating a method performed in the communications network.

Specifically, FIG. 4 shows a method of allocating tracking area identifiers to tracking areas, which may be performed in any convenient network node.

At step 400, the network defines a hierarchical structure of tracking areas, wherein at least one first tracking area is located partly or wholly within a second tracking area, and wherein the second tracking area is located wholly or partly within a third tracking area.

At step 402, the network allocates to the third tracking area a tracking area identifier.

At step 404, the network allocates to the second tracking area a tracking area identifier that has a first number of most significant bits that are equal to the first number of most significant bits of the tracking area identifier allocated to the third tracking area.

At step 406, the network allocates to the or each first tracking area a respective tracking area identifier that has a second number of most significant bits that are equal to the second number of most significant bits of the tracking area identifier allocated to the second tracking area identifier, wherein the second number is larger than the first number.

Figure 5:
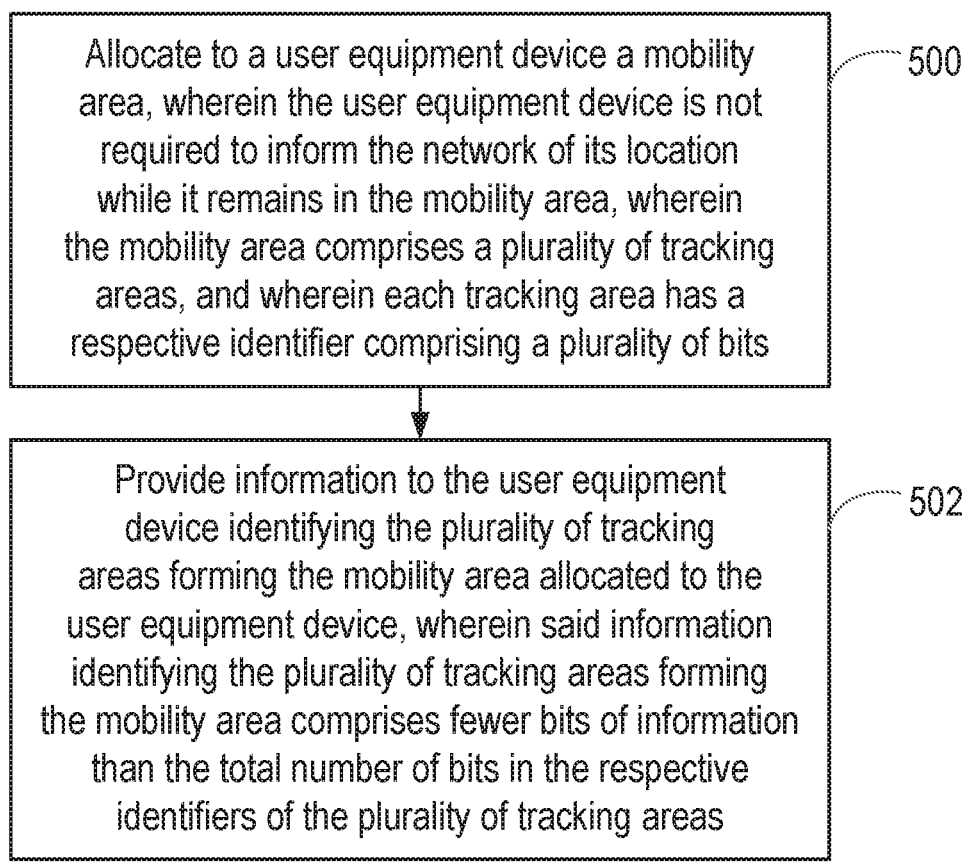
FIG. 5 is a flow chart illustrating a second method.

FIG. 5 is a flow chart, illustrating a further method performed in the communications network.

Specifically, FIG. 5 shows a method of operation of a network node in a cellular communications network.

At step 500, the network node allocates a mobility area to a user equipment device, wherein the user equipment device is not required to inform the network of its location while it remains in the mobility area, wherein the mobility area comprises a plurality of tracking areas, and wherein each tracking area has a respective identifier comprising a plurality of bits.

At step 502, the network node provides information to the user equipment device identifying the plurality of tracking areas forming the mobility area allocated to the user equipment device, wherein said information identifying the plurality of tracking areas forming the mobility area comprises fewer bits of information than the total number of bits in the respective identifiers of the plurality of tracking areas.

Figure 6:
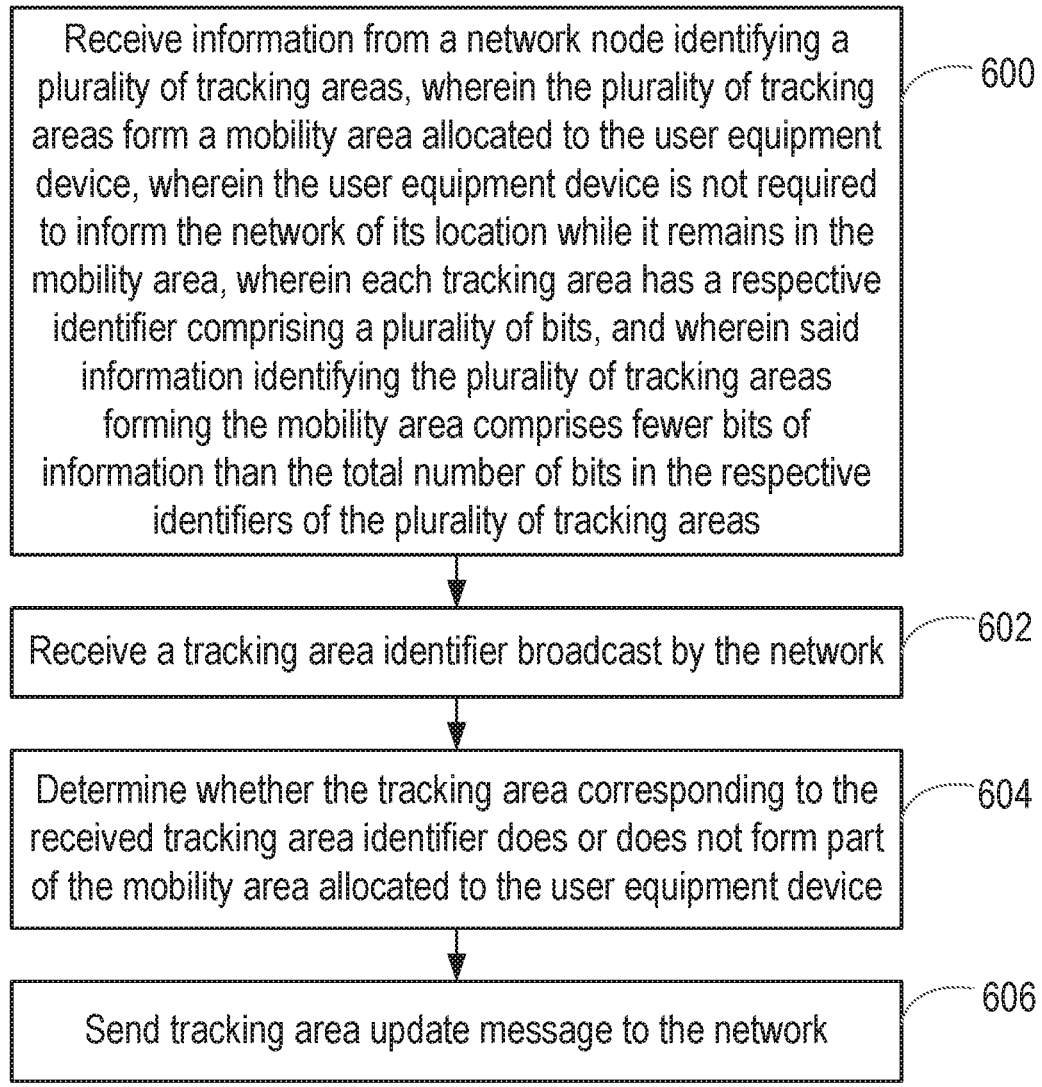
FIG. 6 is a flow chart illustrating a third method.

FIG. 6 is a flow chart, illustrating a further method.

Specifically, FIG. 6 shows a method of operation of a user equipment device in a cellular communications network.

At step 600, the UE receives information from a network node identifying a plurality of tracking areas, wherein the plurality of tracking areas form a mobility area allocated to the user equipment device, wherein the user equipment device is not required to inform the network of its location while it remains in the mobility area, wherein each tracking area has a respective identifier comprising a plurality of bits, and wherein said information identifying the plurality of tracking areas forming the mobility area comprises fewer bits of information than the total number of bits in the respective identifiers of the plurality of tracking areas.

The UE is then able to determine the allocated mobility area based on this information.

At step 602, the UE receives a tracking area identifier broadcast by the network.

At step 604, the UE determines whether the tracking area corresponding to the received tracking area identifier does or does not form part of the mobility area allocated to the user equipment device.

If the UE determines that the tracking area corresponding to the received tracking area identifier does not form part of the mobility area allocated to the user equipment device, then at step 606, the UE sends a tracking area update message to the network.

Figure 7:
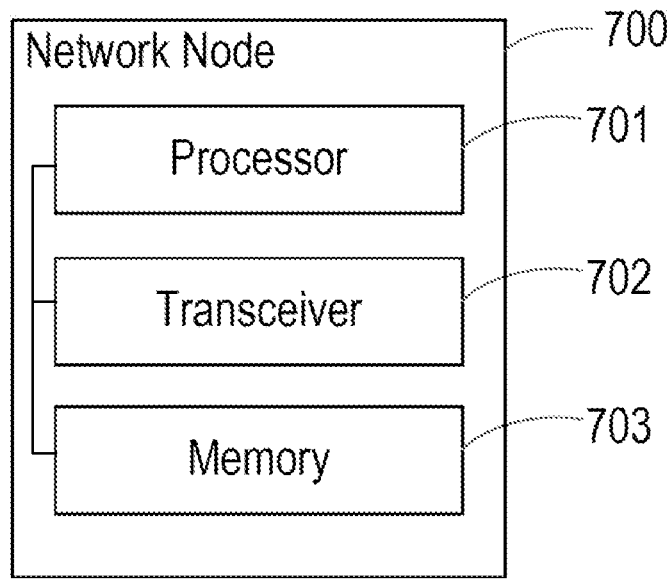
FIG. 7 is a block diagram showing one form of a network node for use in the methods described herein.

FIG. 7 shows a network node 700 that can be adapted or configured to operate according to one or more of the non-limiting example embodiments described. The network node 700 comprises a processor or processing unit 701 that controls the operation of the network node 700. The processing unit 701 is connected to a transceiver unit 702 which is used to transmit signals to and receive signals from user equipment devices and other nodes in the network. The network node 700 also comprises a memory or memory unit 703 that is connected to the processing unit 701 and that contains instructions or computer code executable by the processing unit 701 and other information or data required for the operation of the network node 700 in accordance with the methods described herein.

Figure 8:
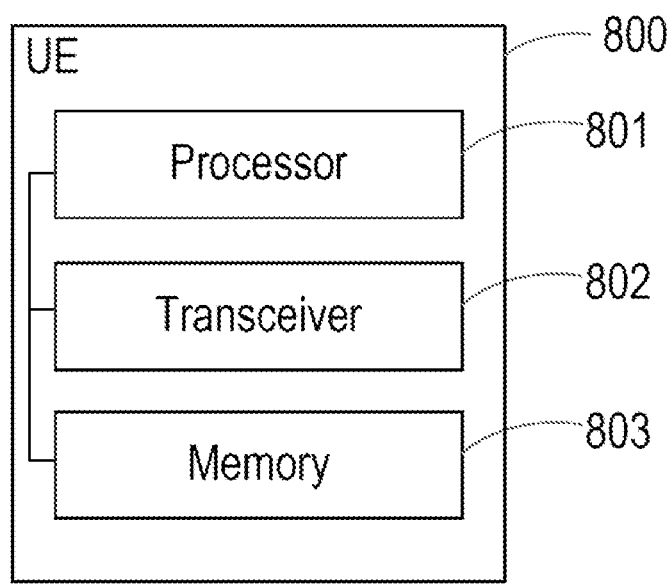
FIG. 8 is a block diagram showing one form of a user equipment device for use in the methods described herein.

FIG. 8 shows a UE 800 that can be adapted or configured to operate according to one or more of the non-limiting example embodiments described. The UE 800 comprises a processor or processing unit 801 that controls the operation of the UE 800. The processing unit 801 is connected to a transceiver unit 802 which includes one or more antenna, and which is used to transmit signals to and receive signals from nodes in the network. The UE 800 also comprises a memory or memory unit 803 that is connected to the processing unit 801 and that contains instructions or computer code executable by the processing unit 801 and other information or data required for the operation of the UE 800 in accordance with the methods described herein.

Figure 9:
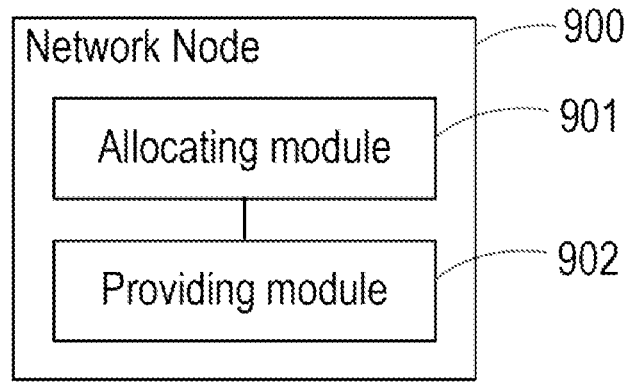
FIG. 9 is a block diagram showing one form of a network node for use in the methods described herein.
Figure 10:
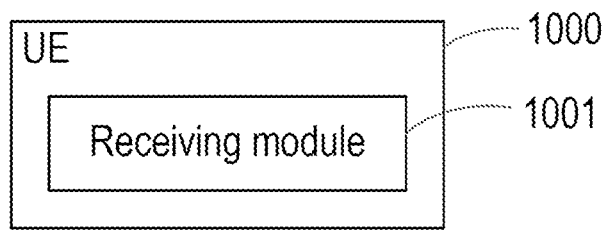
FIG. 10 is a block diagram showing one form of a user equipment device for use in the methods described herein.
Figure 11:
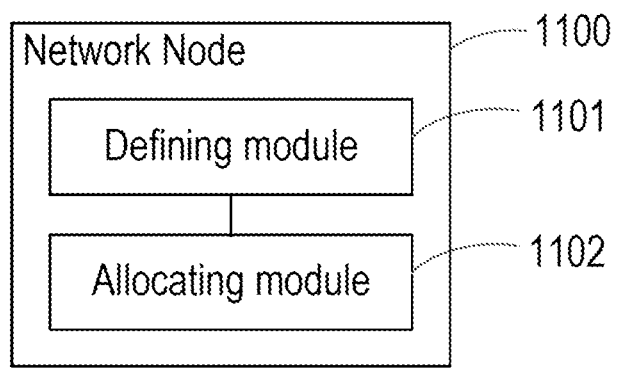
FIG. 11 is a block diagram showing one form of a network node for use in the methods described herein.

FIGS. 9, 10 and 11 illustrate functional units in other embodiments of network nodes 900 and 1100 and UEs 1000, which may execute the methods described herein, for example according to computer readable instructions received from a computer program. It will be understood that the modules illustrated in FIGS. 9, 10 and 11 are software implemented functional units, and may be realised in any appropriate combination of software modules.

Referring to FIG. 9, a network node 900 comprises: an allocating module 901 for allocating to a user equipment device a mobility area, wherein the user equipment device is not required to inform the network of its location while it remains in the mobility area, wherein the mobility area comprises a plurality of tracking areas, and wherein each tracking area has a respective identifier comprising a plurality of bits; and a providing module 902 for providing information to the user equipment device identifying the plurality of tracking areas forming the mobility area allocated to the user equipment device, wherein said information identifying the plurality of tracking areas forming the mobility area comprises fewer bits of information than the total number of bits in the respective identifiers of the plurality of tracking areas.

Referring to FIG. 10, a user equipment device 1000 comprises: a receiving module 1001 for receiving information from a network node identifying a plurality of tracking areas, wherein the plurality of tracking areas form a mobility area allocated to the user equipment device, wherein the user equipment device is not required to inform the network of its location while it remains in the mobility area, wherein each tracking area has a respective identifier comprising a plurality of bits, and wherein said information identifying the plurality of tracking areas forming the mobility area comprises fewer bits of information than the total number of bits in the respective identifiers of the plurality of tracking areas.

Referring to FIG. 11, a network node 1100 comprises: a defining module 1101 for defining a hierarchical structure of tracking areas, wherein at least one first tracking area is located partly or wholly within a second tracking area, and wherein the second tracking area is located wholly or partly within a third tracking area; and at least one allocating module 1102 for allocating to the third tracking area a tracking area identifier, for allocating to the second tracking area a tracking area identifier that has a first number of most significant bits that are equal to the first number of most significant bits of the tracking area identifier allocated to the third tracking area, and for allocating to the or each first tracking area a respective tracking area identifier that has a second number of most significant bits that are equal to the second number of most significant bits of the tracking area identifier allocated to the second tracking area identifier, wherein the second number is larger than the first number.

Figure 12:
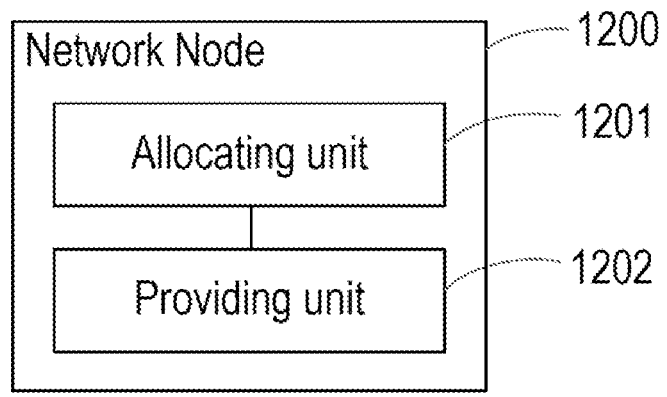
FIG. 12 is a block diagram showing one form of a network node for use in the methods described herein.
Figure 13:
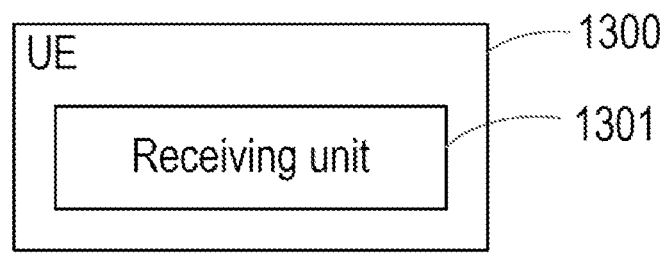
FIG. 13 is a block diagram showing one form of a user equipment device for use in the methods described herein.
Figure 14:
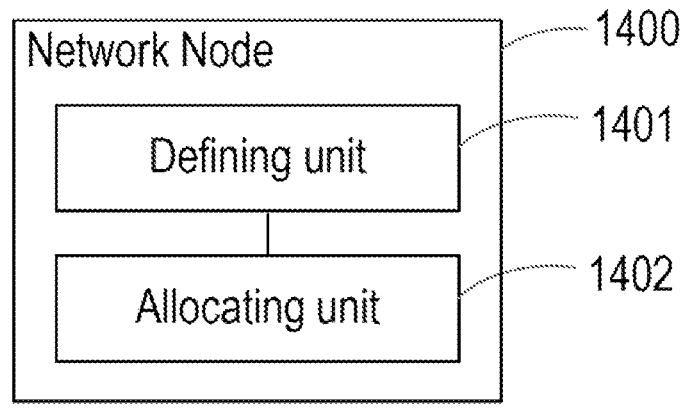
FIG. 14 is a block diagram showing one form of a network node for use in the methods described herein.

FIGS. 12, 13 and 14 illustrate functional units in other embodiments of network nodes 1200 and 1400 and UEs 1300, which may execute any of the methods described herein, for example according to computer readable instructions received from a computer program. It will be understood that the units illustrated in FIGS. 12, 13 and 14 are hardware implemented functional units, and may be realised in any appropriate combination of hardware units.

Referring to FIG. 12, a network node 1200 comprises: an allocating unit 1201 for allocating to a user equipment device a mobility area, wherein the user equipment device is not required to inform the network of its location while it remains in the mobility area, wherein the mobility area comprises a plurality of tracking areas, and wherein each tracking area has a respective identifier comprising a plurality of bits; and a providing unit 1202 for providing information to the user equipment device identifying the plurality of tracking areas forming the mobility area allocated to the user equipment device, wherein said information identifying the plurality of tracking areas forming the mobility area comprises fewer bits of information than the total number of bits in the respective identifiers of the plurality of tracking areas.

Referring to FIG. 13, a user equipment device 1300 comprises: a receiving unit 1301 for receiving information from a network node identifying a plurality of tracking areas, wherein the plurality of tracking areas form a mobility area allocated to the user equipment device, wherein the user equipment device is not required to inform the network of its location while it remains in the mobility area, wherein each tracking area has a respective identifier comprising a plurality of bits, and wherein said information identifying the plurality of tracking areas forming the mobility area comprises fewer bits of information than the total number of bits in the respective identifiers of the plurality of tracking areas.

Referring to FIG. 14, a network node 1400 comprises: a defining unit 1401 for defining a hierarchical structure of tracking areas, wherein at least one first tracking area is located partly or wholly within a second tracking area, and wherein the second tracking area is located wholly or partly within a third tracking area; and at least one allocating unit 1402 for allocating to the third tracking area a tracking area identifier, for allocating to the second tracking area a tracking area identifier that has a first number of most significant bits that are equal to the first number of most significant bits of the tracking area identifier allocated to the third tracking area, and for allocating to the or each first tracking area a respective tracking area identifier that has a second number of most significant bits that are equal to the second number of most significant bits of the tracking area identifier allocated to the second tracking area identifier, wherein the second number is larger than the first number.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation by a network node in a cellular communications network, the method comprising:
   allocating a mobility area to a user equipment device, wherein the user equipment device is not required to inform the cellular communications network of the location of the user equipment device while the user equipment device remains in the mobility area, wherein the mobility area encompasses one or more lower-level tracking areas of the cellular communications network that are contained within a higher-level tracking area of the cellular communications network; and
   identifying the mobility area to the user equipment device by:
      indicating a subset of bits that are commonly shared by respective tracking area identifiers of the higher-level tracking area and all lower-level tracking areas contained within the higher-level tracking area; and
      indicating a bitmap in which each bit position corresponds to a respective one of the lower-level tracking areas contained within the higher-level tracking area, and wherein a bit within each bit position is set or not set in dependence on whether the corresponding lower-level tracking area is or is not included in the mobility area.

2. The method of claim 1, wherein, for each bit position of the bitmap, the bit within the bit position being set to a "1" indicates that the corresponding lower-level tracking area belongs to the mobility area, and the bit being set to a "0" indicates that the corresponding lower-level tracking area does not belong to the mobility area.

3. The method of claim 1, wherein the higher-level tracking area encompasses a plurality of lower-level tracking areas, and wherein the bitmap includes one or more set bits indicating that the one or more corresponding lower-level tracking areas from among the plurality of lower-level tracking areas belong to the mobility area.

4. The method of claim 1, wherein the respective tracking area identifier of the higher-level tracking area comprises a first binary value and wherein the respective tracking area identifier of each lower-level tracking area comprises the first binary value and a binary-valued extension that defines the lower-level tracking area within the higher-level tracking area.

5. The method of claim 1, wherein there are as many bit positions in the bitmap as there are lower-level tracking areas contained within the higher-level tracking area.

6. The method of claim 1, wherein the higher-level tracking area contains lower-level tracking areas at two or more hierarchical levels below a hierarchical level associated with the higher-level tracking area, and wherein the bit positions within the bitmap correspond to the lower-level tracking areas at a particular one of the two or more hierarchical levels below the hierarchical level associated with the higher-level tracking area.

7. A network node configured for operation in a cellular communications network, the network node comprising a processor and a memory, the memory containing instructions executable by the processor, whereby the network node is configured to:
   allocate a mobility area to a user equipment device, wherein the user equipment device is not required to inform the cellular communications network of the location of the user equipment device while the user equipment device remains in the mobility area, wherein the mobility area encompasses one or more lower-level tracking areas of the cellular communications network that are contained within a higher-level tracking area of the cellular communications network; and
   identify the mobility area to the user equipment device by:
      indicating a subset of bits that are commonly shared by respective tracking area identifiers of the higher-level tracking area and all lower-level tracking areas contained within the higher-level tracking area; and
      indicating a bitmap in which each bit position corresponds to a respective one of the lower-level tracking areas contained within the higher-level tracking area, and wherein a bit within each bit position is set or not set in dependence on whether the corresponding lower-level tracking area is or is not included in the mobility area.

8. The network node of claim 7, wherein, for each bit position of the bitmap, the bit within the bit position being set to a "1" indicates that the corresponding lower-level tracking area belongs to the mobility area, and the bit being set to a "0" indicates that the corresponding lower-level tracking area does not belong to the mobility area.

9. The network node of claim 7, wherein the higher-level tracking area encompasses a plurality of lower-level tracking areas, and wherein the bitmap includes one or more set bits indicating that the one or more corresponding lower-level tracking areas from among the plurality of lower-level tracking areas belong to the mobility area.

10. The network node of claim 7, wherein the respective tracking area identifier of the higher-level tracking area comprises a first binary value and wherein the respective tracking area identifier of each lower-level tracking area comprises the first binary value and a binary-valued extension that defines the lower-level tracking area within the higher-level tracking area.

11. The network node of claim 7, wherein there are as many bit positions in the bitmap as there are lower-level tracking areas contained within the higher-level tracking area.

12. The network node of claim 7, wherein the higher-level tracking area contains lower-level tracking areas at two or more hierarchical levels below a hierarchical level associated with the higher-level tracking area, and wherein the bit positions within the bitmap correspond to the lower-level tracking areas at a particular one of the two or more hierarchical levels below the hierarchical level associated with the higher-level tracking area.

13. A method of operation by a user equipment device with respect to a cellular communications network, the method comprising:
   receiving information from a network node of the cellular communications network; and
   identifying from the information a mobility area allocated by the cellular communications network to the user equipment device;
   wherein the user equipment device is not required to inform the cellular communications network of the location of the user equipment device while the user equipment device remains in the mobility area, wherein the mobility area encompasses one or more lower-level tracking areas of the cellular communications network that are contained within a higher-level tracking area of the cellular communications network; and
   wherein the information indicates:
      a subset of bits that are commonly shared by respective tracking area identifiers of the higher-level tracking area and all lower-level tracking areas contained within the higher-level tracking area; and
      a bitmap in which each bit position corresponds to a respective one of the lower-level tracking areas contained within the higher-level tracking area, and wherein a bit within each bit position is set or not set in dependence on whether the corresponding lower-level tracking area is or is not included in the mobility area.

14. The method of claim 13, further comprising subsequently receiving a broadcasted tracking area identifier and determining whether the tracking area corresponding to the broadcasted tracking area identifier belongs to the mobility area and, if not, performing a tracking area update with respect to the cellular communications network.

15. The method of claim 13, wherein, for each bit position of the bitmap, the bit within the bit position being set to a "1" indicates that the corresponding lower-level tracking area belongs to the mobility area, and the bit being set to a "0" indicates that the corresponding lower-level tracking area does not belong to the mobility area.

16. The method of claim 13, wherein the higher-level tracking area encompasses a plurality of lower-level tracking areas, and wherein the bitmap includes one or more set bits indicating that the one or more corresponding lower-level tracking areas from among the plurality of lower-level tracking areas belong to the mobility area.

17. The method of claim 13, wherein the respective tracking area identifier of the higher-level tracking area comprises a first binary value and wherein the respective tracking area identifier of each lower-level tracking area comprises the first binary value and a binary-valued extension that defines the lower-level tracking area within the higher-level tracking area.

18. The method of claim 13, wherein there are as many bit positions in the bitmap as there are lower-level tracking areas contained within the higher-level tracking area.

19. The method of claim 13, wherein the higher-level tracking area contains lower-level tracking areas at two or more hierarchical levels below a hierarchical level associated with the higher-level tracking area, and wherein the bit positions within the bitmap correspond to the lower-level tracking areas at a particular one of the two or more hierarchical levels below the hierarchical level associated with the higher-level tracking area.

20. A user equipment device comprising a processor and a memory, the memory containing instructions executable by the processor, whereby the user equipment device is configured to:
receive information from a network node of a cellular communications network; and
identify from the information a mobility area allocated by the cellular communications network to the user equipment device;
wherein the user equipment device is not required to inform the cellular communications network of the location of the user equipment device while the user equipment device remains in the mobility area, wherein the mobility area encompasses one or more lower-level tracking areas of the cellular communications network that are contained within a higher-level tracking area of the cellular communications network; and
wherein the information indicates:
a subset of bits that are commonly shared by respective tracking area identifiers of the higher-level tracking area and all lower-level tracking areas contained within the higher-level tracking area; and
a bitmap in which each bit position corresponds to a respective one of the lower-level tracking areas contained within the higher-level tracking area, and wherein a bit within each bit position is set or not set in dependence on whether the corresponding lower-level tracking area is or is not included in the mobility area.

21. The user equipment device of claim 20, wherein the user equipment device is further configured to subsequently receive a broadcasted tracking area identifier and determine whether the tracking area corresponding to the broadcasted tracking area identifier belongs to the mobility area and, if not, perform a tracking area update with respect to the cellular communications network.

22. The user equipment device of claim 20, wherein, for each bit position of the bitmap, the bit within the bit position being set to a "1" indicates that the corresponding lower-level tracking area belongs to the mobility area, and the bit being set to a "0" indicates that the corresponding lower-level tracking area does not belong to the mobility area.

23. The user equipment device of claim 20, wherein the higher-level tracking area encompasses a plurality of lower-level tracking areas, and wherein the bitmap includes one or more set bits indicating that the one or more corresponding lower-level tracking areas from among the plurality of lower-level tracking areas belong to the mobility area.

24. The user equipment device of claim 20, wherein the respective tracking area identifier of the higher-level tracking area comprises a first binary value and wherein the respective tracking area identifier of each lower-level tracking area comprises the first binary value and a binary-valued extension that defines the lower-level tracking area within the higher-level tracking area.

25. The user equipment device of claim 20, wherein there are as many bit positions in the bitmap as there are lower-level tracking areas contained within the higher-level tracking area.

26. The user equipment device of claim 20, wherein the higher-level tracking area contains lower-level tracking areas at two or more hierarchical levels below a hierarchical level associated with the higher-level tracking area, and wherein the bit positions within the bitmap correspond to the lower-level tracking areas at a particular one of the two or more hierarchical levels below the hierarchical level associated with the higher-level tracking area.

* * * * *